(12) United States Patent
Li et al.

(10) Patent No.: US 7,962,176 B2
(45) Date of Patent: Jun. 14, 2011

(54) BASE STATION SYSTEM

(75) Inventors: Shihe Li, Beijing (CN); Tiezhu Xu, Beijing (CN); Hongbo Wang, Beijing (CN); Liwei Wang, Beijing (CN); Xiaozhou Chen, Beijing (CN); Xian Liu, Beijing (CN); Guoxin Zhao, Beijing (CN); Jianfeng Wu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 566 days.

(21) Appl. No.: 11/885,948

(22) PCT Filed: Dec. 29, 2005

(86) PCT No.: PCT/CN2005/002352
§ 371 (c)(1),
(2), (4) Date: May 28, 2008

(87) PCT Pub. No.: WO2006/094441
PCT Pub. Date: Sep. 14, 2006

(65) Prior Publication Data
US 2008/0317464 A1    Dec. 25, 2008

(30) Foreign Application Priority Data
Mar. 7, 2005 (CN) .......................... 2005 1 0051571

(51) Int. Cl.
*H04B 1/38* (2006.01)
(52) U.S. Cl. ........ 455/561; 455/3.01; 455/334; 455/337
(58) Field of Classification Search .................. 455/561, 455/562.1, 3.01, 334, 336, 337
See application file for complete search history.

(56) References Cited

U.S. PATENT DOCUMENTS

| 2008/0214221 A1* | 9/2008 | Kiyomoto et al. | 455/517 |
| 2008/0318589 A1* | 12/2008 | Liu et al. | 455/561 |
| 2009/0149221 A1* | 6/2009 | Liu et al. | 455/561 |

FOREIGN PATENT DOCUMENTS

| CN | 1281322 A | 1/2001 |
| CN | 1409563 A | 4/2003 |
| CN | 1571551 A | 1/2005 |

* cited by examiner

*Primary Examiner* — Lana N Le
(74) *Attorney, Agent, or Firm* — Merchant & Gould P.C.

(57) ABSTRACT

The present invention discloses a base station system, including an indoor part and a remote RF subsystem (RRS). The indoor part includes a RIU, a CCU, a BBU, a GPSU and a local interface unit. The RRS includes a remote interface unit, a RF transceiver unit (TRU) and an antenna. The local interface unit and the remote interface unit are for signal intercommunicating between the indoor part of the base station and the RSS. The TRU is a RF transceiver module of the conventional RFU, for amplifying an analog RF signal from the remote interface unit and transmitting the signal to the antenna. By flexibly selecting between an optical cable and an If cable, the interface unit of the present invention provides a digital baseband remote manner and an IF remote manner. According to the structure of the base station of the present invention, the number of the base station sites and the network operating cost decreases; on the other side, since one base station may cover a cell by smart antenna with only one optical cable or IF cable, the difficulty in mounting is reduced.

16 Claims, 6 Drawing Sheets

BASE STATION SYSTEM

FIELD OF THE INVENTION

The present invention relates to a design of base station architecture, especially to a base station system.

BACKGROUND OF THE INVENTION

In a wireless cellular communication system, a wireless access network includes two main parts which are a base station system and a wireless network controller respectively, wherein the design of the base station system directly influences the networking mode of the wireless network, the covering quality of the network and the operation cost of constructing the network.

The importance of the design of the base station system will be analyzed with an example of the TD-SCDMA system.

Figure 1:
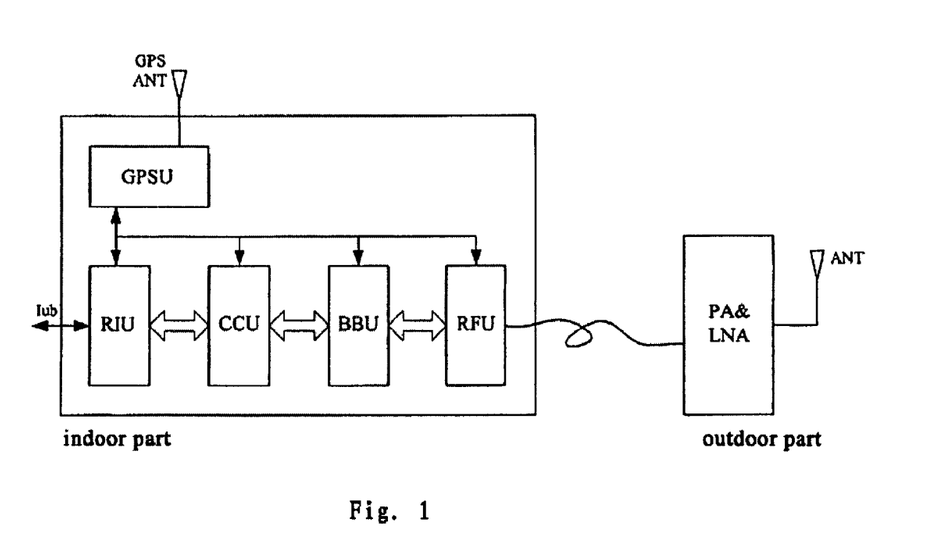
FIG. 1 is a schematic diagram showing a configuration of a conventional base station system.

FIG. 1 is a schematic diagram showing a configuration of a conventional base station. As shown in FIG. 1, in the TD-SCDMA system, Node B is connected with a radio network controller (RNC) through a standard Iub interface and Node B includes two parts which are located indoors and outdoors respectively.

The outdoor part of Node B includes an amplifier unit (PA (power amplifier) & LNA (low noise amplifier)) and an antenna (ANT), wherein the PA & LNA receives an analog RF signal outputted from the indoor part of Node B through a RF cable, amplifies the signal and transmits the signal through the ANT; or the PA & LNA receives and amplifies an analog RF signal from the ANT and transmits the analog RF signal to a RF processing unit (RFU) of the indoor part of Node B through the RF cable.

The indoor part of Node B includes five parts:

a RNC interface unit (RIU), for performing an interface function between Node B and the RNC; a central control unit (CCU), for performing a main control function of Node B and a function of switching signaling and service data between units of Node B, wherein data from the RNC is transmitted to the CCU through the RIU and data to be transmitted upwardly in Node B is transferred to the RNC through the RIU; a digital baseband unit (BBU), for performing a processing function of the digital signal at the symbol level and the chip level at the physical layer and for intercommunicating a digital baseband signal with the RFU; the RFU is for performing conversion between a digital baseband signal and an analog RF signal; and a GPS unit (GPSU) and a GPS antenna (GPS ANT), for obtaining a global position system (GPS) clock signal through the GPS ANT, generating a clock signal and providing the generated clock signal to other units in the Node B.

Figure 2:
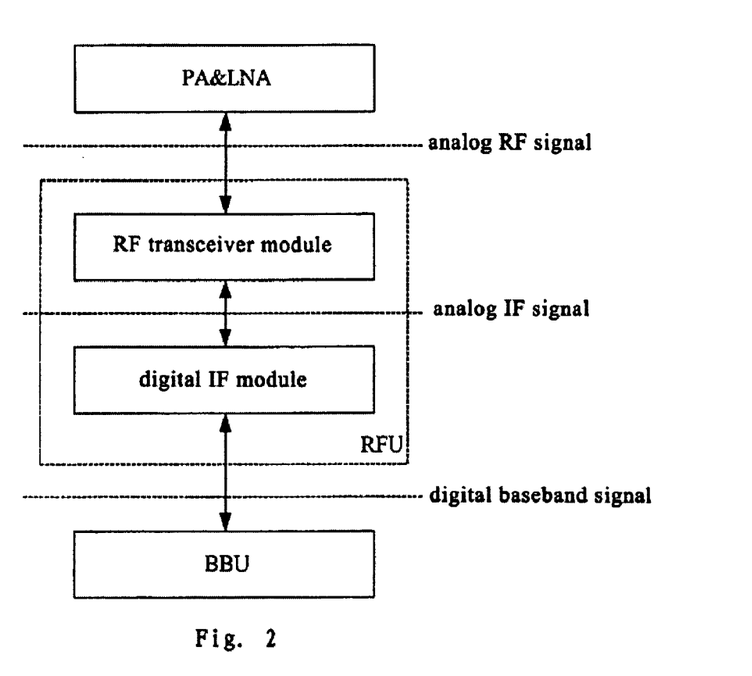
FIG. 2 is a schematic diagram showing modules constituting a RFU and their functions.

The RFU includes a digital intermediate frequency (IF) module and a RF transceiver module. FIG. 2 shows the modules of the RFU shown in FIG. 1 and their functions. As shown in FIG. 2, the BBU is connected with the digital IF module of the RFU and the digital baseband signal is transmitted between the BBU and the digital IF module of the RFU; the digital IF module of the RFU is connected with the RF processing module of the RFU and the analog IF signal is between the digital IF module of the RFU and the RF processing module of the RFU; the RF processing module of the RFU is connected with the PA&LNA and the analog RF signal is between the RF processing module of the RFU and the PA&LNA through the RF cable. The detailed functions are as follows:

Through the uplink path of the RFU, the RFU receives the analog RF signal transmitted from the PA&LNA, processes the received analog RF signal and the digital baseband signal to the BBU. The processing of the RFU on the received analog RF signal includes: (1) the RF transceiver module of the RFU performs the amplifying, filtering, gain control, conversion from the analog RF signal to the analog IF signal on the analog RF signal received through the antenna, performs the amplifying, filtering and gain control on the analog IF signal obtained after the conversion and finally transmits the processed analog IF signal to the digital IF module of the RFU; (2) the digital IF module of the RFU performs the A/D conversion, digital down-conversion and baseband signal shaping and filtering processing on the received analog IF signal to obtain the digital baseband signal and transmits the digital baseband signal to the BBU.

Through the downlink path of the RFU, the RFU receives the digital baseband signal from the BBU, processes the received digital baseband signal, and transmits the analog RF signal to the PA&LNA. The processing of the RFU on the received digital baseband signal includes: (1) the digital IF module of the RFU performs the baseband signal shaping and filtering processing, digital up-conversion and D/A conversion on the received digital base station signal to generate the analog IF signal and transmits the generated analog IF signal to the RF transceiver module of the RFU; (2) the RF transceiver module of the RFU performs the amplifying, filtering, gain control, conversion from the analog IF signal to the analog RF signal on the received analog IF signal, performs the amplifying, filtering and gain control on the analog RF signal obtained after the conversion and finally transmits the processed analog RF signal to the PA&LNA.

In the conventional base station system, since the RFU is located at the indoor part of the base station and there is requirement on the distance between the RF transceiver module and the antenna, which makes the distance between the indoor part of the base station and the antenna limited to scores of meters. In addition, since the area covered by the base station is decided by the RF transceiver module while the RF transceiver module of the conventional base station belongs to the indoor part, when the wireless communication needs to cover larger and larger area, there should be many base station sites so as to cover different areas with the conventional base stations, therefore, the network operation cost increases. In addition, since the design of the conventional base station makes the indoor part and the outdoor part of the base station transmitting signals through the RF cable and the RF cable is thick and heavy, which brings difficulty in mounting the RF cable. Especially, if the base station adopts the smart antenna, multiple RF cables should be mounted, which adds difficulty in mounting and cost.

SUMMARY OF THE INVENTION

A main objective of the present invention is to provide a base station system, which can improve a covering ability of the base station and can reduce a network operation cost.

In order to achieve the above objective, a technical solution of the present invention is implemented as follows:

A base station system includes an indoor part and an outdoor part, wherein the indoor part includes a RNC interface unit RIU for performing an interface function between Node B and the RNC, and a GPSU and a GPS antenna for providing a clock signal to other units in Node B, the indoor part further includes:

a central control unit CCU, for performing a main control function of Node B and a function of switching signaling and service data between units of Node B;

a digital baseband unit BBU, for performing a processing function of the digital signal at the symbol level and the chip level at the physical layer and for intercommunicating digital baseband signals with a local interface unit; and the local interface unit, for converting the digital baseband signal from the BBU to an interface signal and transmitting the interface signal to a remote interface unit, or for converting an interface signal from the remote interface unit to a digital baseband signal and transmitting the digital baseband signal to the BBU;

the outdoor part is a remote RF subsystem RRS, includes an antenna for receiving and transmitting an analog RF signal, and further includes:

the remote interface unit, for converting the interface signal from the local interface unit to an analog IF signal and transmitting the analog IF signal to a RF transceiver unit TRU, or for converting an analog IF signal from the TRU to an interface signal and transmitting to the local interface unit; and the RF transceiver unit TRU, for converting the analog IF signal from the remote interface unit to an analog RF signal and transmitting the analog RF signal to the antenna, or for converting an analog RF signal from the antenna to an analog IF signal and transmitting the analog IF signal to the remote interface unit.

the local interface unit is a local baseband interface unit BIU-L, and the remote interface unit includes a remote baseband interface unit BIU-R and a digital IF unit IFU;

the BIU-R receives the interface signal from the BIU-L and outputs a digital baseband signal to the IFU, and then the IFU converts the received digital baseband signal to an analog IF signal and outputs the analog IF signal to the TRU;

or the IFU receives the analog IF signal from the TRU and outputs a digital baseband signal to the BIU-R, and then the BIU-R converts the received digital baseband signal to an interface signal and transmits the interface signal to the BIU-L.

The interface signal is a digital baseband optical signal.

the remote interface unit is a remote IF processing unit IIU-R;

the local interface unit includes an IFU and a local IF interface unit IIU-L;

the IFU receives the digital baseband signal from the BBU, outputs an analog IF signal to the IIU-L and the IIU-L converts the received analog IF signal to an interface signal and transmits the interface signal to the IIU-R;

or the IIU-L receives the interface signal from the IIU-R and outputs an analog IF signal to the IFU, and then the IFU converts the received analog IF signal to a digital baseband signal and outputs the digital baseband signal to the BBU.

The interface signal is an analog IF signal or an analog IF optical signal.

The local interface unit includes an IFU and an IIU-L, and the remote interface unit includes an IIU-R;

the IFU receives the digital baseband signal from the BBU, outputs an analog IF signal to the IIU-L and the IIU-L converts the received analog IF signal to an interface signal and transmits the interface signal to the IIU-R;

or the IIU-L receives the interface signal from the IIU-R and outputs an analog IF signal to the IFU, and then the IFU converts the received analog IF signal to a digital baseband signal and outputs the digital baseband signal to the BBU.

The interface signals transmitted between the BIU-L and the BIU-R are digital baseband optical signals;

the interface signals transmitted between the IIU-L and the IIU-R are analog IF signals or analog IF optical signals.

The BBU comprises a first digital baseband unit BBU1 and a second digital baseband unit BBU2 for processing digital signals at the symbol level and the chip level at the physical layer, wherein the BBU1 intercommunicates the digital baseband signals with the BIU-L of the local interface unit and the BBU2 intercommunicates the digital baseband signals with the IFU of the local interface unit.

The IIU-L comprises:

first up-conversion modules, for converting analog IF signals from the IFU and outputting the converted analog IF signals at different central frequencies to a first multiplexing module;

a FSK modulating module, for modulating an operation and maintenance control signal from the CCU to a certain fixed frequency and outputting the modulated operation and maintenance control signal to the first multiplexing module;

the first multiplexing module, for multiplexing in frequency the received signals and a clock signal fclk from the IFU and outputting the multiplexed analog IF signal to a second demultiplexing module;

a first demultiplexing module, for demultiplexing an analog IF signal from a second multiplexing module of the IIU-R and outputting demultiplexed analog IF signals at different central frequencies to first down-conversion modules;

the first down-conversion modules, for converting the analog IF signals at different central frequencies from the first demultiplexing module and outputting the converted analog IF signals to the IFU of the local interface unit;

the IIU-R comprises:

the second demultiplexing module, for demultiplexing the analog IF signal from the first multiplexing module of the IIU-R and outputting the demultiplexed analog IF signals to second down-conversion modules, the demultiplexed fclk signal to the TRU, second up-conversion modules and a second down-conversion module, the demultiplexed OM control signal being FSK modulated to a FSK demodulating module;

the second down-conversion modules, for converting the analog IF signals at different central frequencies from the second demultiplexing module and outputting the converted analog IF signals to the TRU;

the second up-conversion modules, for converting the analog IF signals from the TRU and outputting the converted analog IF signals at different central frequencies to the second multiplexing module;

the second multiplexing module, for multiplexing in frequency the analog IF signals from the second up-conversion modules and outputting the multiplexed analog IF signal to the first demultiplexing module of the IIU-L;

the FSK demodulating module, for demodulating the modulated OM control signal from the second demultiplexing module and outputting the demodulated signal to the TRU.

The number of the first up-conversion modules and the first down-conversion modules respectively is one or more than one and the number of the first up-conversion modules and the first down-conversion modules respectively equals to the number of the antennas used;

the number of the second up-conversion modules and the second down-conversion modules respectively is one or more than one and the number of the second up-conversion modules and the second down-conversion modules respectively equals to the number of the antennas used.

The IIU-L and IIU-R further comprise an optical transceiver module respectively, for receiving the analog IF signals from the first multiplexing module of the IIU-L and the second multiplexing module of the IIU-R respectively and outputting the analog IF optical signals to the optical cable;

or for receiving the analog IF optical signals from the optical cable respectively and outputting the analog IF signals to the first multiplexing module of the IIU-L and the second multiplexing module of the IIU-R respectively.

The BIU-L is an optical transceiver module; the BIU-R is an optical transceiver module.

The antenna is a single antenna or a double antenna or a four-antenna or an eight-antenna.

The interface signal is a digital baseband optical signal and/or an analog IF signal; or a digital baseband optical signal and/or an analog IF optical signal.

The local interface unit connects with the remote interface unit through an optical cable or an IF cable.

The indoor part connects with one or more than one RRS through one or more than one interface unit to form a serial, star or mixed connection.

The above solution shows the base station system of the present invention adds an interface unit in the indoor part and the outdoor part constituted by the RSS respectively and performs the signal intercommunicating between the indoor part and the RRS through the interface unit. The indoor part includes the RIU, CCU, BBU, GPSU, GPS ANT and local interface unit; the RRS includes the remote interface unit, RF transceiver unit (TRU) and antenna, with the former PA&LNA omitted. The local interface unit and the remote interface unit are for signal intercommunicating between the indoor part of the base station and the RSS and the optical cable or the IF cable can connect the two interfaces; the TRU includes a former RFU RF transceiver module, for performing the conversion between the analog IF signal and the analog RF signal. According to the design of the base station system of the present invention, the RF transceiver module for covering the cell is at the remote side, which meets the requirement for distance between the RF transceiver module and the antenna and increases the distance between the indoor part and the outdoor part of the base station. The indoor part of the base station system can connect with the RRS through the optical cable or the IF cable for a long distance, so that the number of the base station sites and the difficulty in project mounting can be reduced. In addition, since the RF transceiver module can be flexibly located with the antenna at different places, one base station may cover many cells with the multiple antenna or the smart antenna and one optical cable or analog IF cable can provide connection between the indoor part and the RRS, which reduces the network operating cost and the project cost.

In addition, according to the practice, different designs of the interface units may be realized by two manners, which are digital baseband remote and IF remote. The optical cable or the IF cable can connect the indoor part of the base station and the RRS.

DETAILED DESCRIPTION OF THE INVENTION

The main idea of the present invention is to design the RF transceiver module at the remote side and to set an interface unit at the indoor part of the base station and the RRS respectively so as to perform the signal intercommunication between the indoor part of the base station and the RRS and thus improve the flexibility of the base station system.

Figure 3:
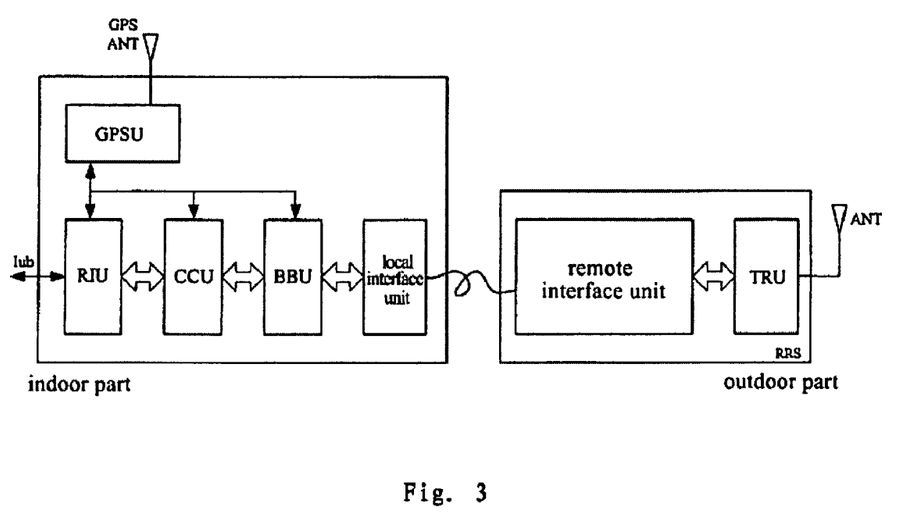
FIG. 3 is a schematic diagram showing a configuration of a base station system according to the present invention.

FIG. 3 is a schematic diagram showing a configuration of a base station system according to the present invention. As shown in FIG. 3, taking TD-SCDMA system as an example, a Node B and a RNC are connected through a standard Iub interface. The base station includes an indoor part and an outdoor part constituted by a remote RF sub-system (RRS).

The RSS includes a remote interface unit, a RF transceiver unit (TRU) and an ANT. The TRU receives an analog IF signal from the remote interface unit, converts the signal to an analog RF signal, amplifies the analog RF signal and transmits the amplified analog RF signal through the ANT; or the TRU receives and amplifies an analog RF signal from the ANT and converts the analog RF signal to an analog IF signal, and then the remote interface unit makes processing on the analog IF signal and finally transmits the processed interface signal to a local interface unit of the indoor part of the base station system through an optical cable or an IF cable.

The indoor part of the base station includes five parts: a RNC interface unit (RIU), for performing an interface function between Node B and the RNC; a central control unit (CCU), for performing a main control function of Node B and a function of switching signaling and service data between units of Node B, wherein data from the RNC is transmitted to the CCU through the RIU and data to be transmitted upwardly in Node B is transferred to the RNC through the RIU; a digital baseband unit (BBU), for performing a processing function of a digital signal at the symbol level and the code chip level at the physical layer and for interchanging a digital baseband signal with the local interface unit; a GPS unit (GPSU) and a GPS antenna (GPS ANT), for obtaining a GPS clock signal through the GPS ANT, generating a clock signal and provide the generated clock signal to the RIU, CCU, BBU in the Node B; and the local interface unit, for converting the digital baseband signal received from the BBU to an interface signal and transmitting the interface signal to the remote interface unit through the optical cable or the IF cable, or for converting the interface signal received through the optical cable or the IF cable to a digital baseband signal and transmitting the digital baseband signal to the BBU.

In order to better understand the objectives, technical solutions and advantages of the present invention, the preferred embodiments will be described in combination with the accompanying drawings.

The configuration of the base station described below is the same with that of the conventional base station, which includes an uplink path and a downlink path.

Embodiment 1

Digital Baseband Remote Manner

Figure 4:
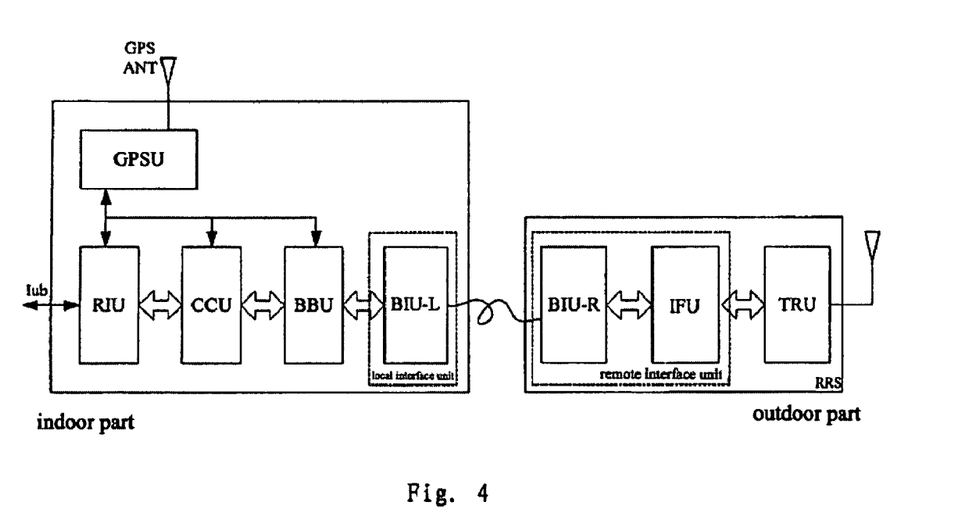
FIG. 4 is a schematic diagram showing a configuration of a base station system according to a first embodiment of the present invention.

FIG. 4 is a schematic diagram showing a configuration of a base station system according to a first embodiment of the present invention.

The local interface unit is a local baseband interface unit (BIU-L). The functions of the local interface unit are: (1) through the downlink path of the local interface unit, the BIU-L receives the digital baseband signal from the BBU, converts the electric signal to a digital baseband optical signal and transmits the optical signal to the remote interface unit, wherein the interface signal is the digital baseband optical signal; (2) through the uplink path of the local interface unit, the BIU-L receives the interface signal, i.e. a digital baseband optical signal from the remote interface unit, converts the optical signal to a digital baseband electric signal and transmits the electric signal to the BBU. The BIU-L may implement its functions by an optical transceiver module with an electric/optical conversion function and an optical/electric conversion function, such as the single mode optical transceiver module PT7320-41 or the single mode optical transceiver module PT7320-61.

The remote interface unit includes a remote baseband interface unit (BIU-R) and a digital IF unit (IFU), wherein the IFU is a digital IF module of the conventional RFU. The functions of the remote interface unit are: (1) through the downlink path of the remote interface unit, the BIU-R receives the digital baseband optical signal from the local interface unit, converts the optical signal to the digital baseband signal, i.e., the digital baseband electric signal, and transmits the electric signal to the IFU and then the IFU performs the baseband signal shaping and filtering, digital up-conversion and D/A conversion on the received digital baseband signal to generates the analog IF signal and transmits the analog IF signal to the TRU; (2) through the uplink path of the local interface unit, the IFU receives the analog IF signal from the TRU, performs the A/D conversion, digital down-conversion, and baseband signal shaping and filtering on the analog IF signal to generate the digital baseband signal and transmits the digital baseband signal to the BIU-R, and then the BIU-R performs converts the electric/optical conversion on the received digital baseband signal to obtain the digital baseband optical signal and transmits the optical signal to the local interface unit. The BIU-R may implement its functions by an optical transceiver module with an electric/optical conversion function and an optical/electric conversion function, such as the single mode optical transceiver module PT7320-41 or the single mode optical transceiver module PT7320-61.

The TRU is a RF transceiver module of the conventional RFU. Since the RF transceiver module of the RFU has the function of amplifying the signal, the PA&LNA unit is omitted in the present invention. The functions of the TRU are: (1) through the downlink path of the TRU, the TRU receives the analog IF signal from the IFU, performs the amplifying, filtering, gain control, conversion from the analog IF signal to the analog RF signal on the analog RF signal, performs the amplifying, filtering and gain control on the analog RF signal obtained after the conversion and finally transmits the processed analog RF signal to the ANT; (2) through the uplink path of the TRU, the TRU receives the analog RF signal from the ANT, performs the amplifying, filtering, gain control, conversion from the analog RF signal to the analog IF signal on the analog RF signal, performs the amplifying, filtering and gain control on the analog IF signal obtained after the conversion and finally transmits the processed analog IF signal to the remote interface unit.

The above shows the base station system realized by the digital baseband remote manner according to the present invention. The above solution shows the indoor part and the RRS are divided with the digital baseband signal in this embodiment and the indoor part and the RRS can be connected with the optical cable. When the distance between the indoor part and the RRS is far, the digital baseband remote manner may be used.

In addition, the RRS may use different covering modes according to the requirements, such as the single antenna covering, two-antenna covering, four-antenna covering, eight-antenna covering etc. When the digital baseband remote manner is adopted, optical transceivers at different rates can be used, such as electric/optical or optical/electric conversion chips at different rates, to perform the signal conversion. For example, when the single antenna covering mode is adopted, a low rate conversion chip can be used and when a multiple-antenna covering mode is adopted, a high rate conversion chip can be used. The indoor part of the base station can be connected with one or more RRS through one or more interface unit to form a chain, star or mixed connection with the digital optical cable.

Figure 5:
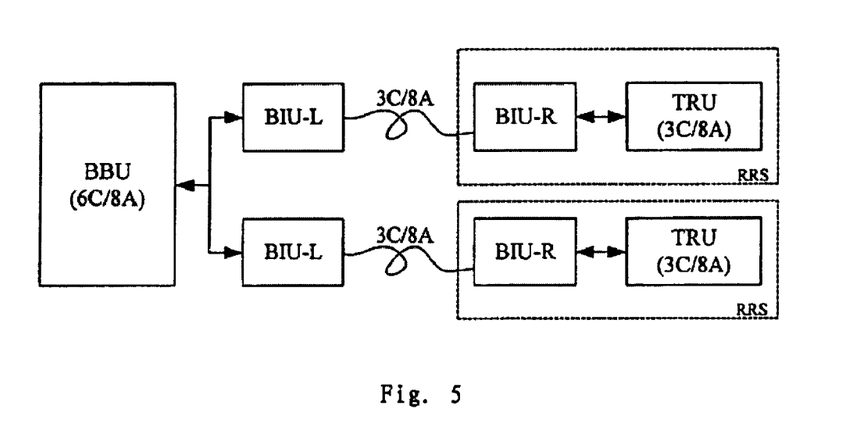
FIG. 5 is a schematic diagram showing a connection between an indoor part of the base station and a RRS according to the configuration of the first embodiment of the present invention.

FIG. 5 is a schematic diagram showing a connection between the indoor part of the base station and the RRS according to the first embodiment of the present invention. Suppose there is a BBU processing six carrier frequencies, a TRU processing three carrier frequencies and the eight-antenna covering manner is adopted. According to the structure of the base station of the first embodiment of the invention, as shown in FIG. 5, in the digital baseband remote manner, the base station remote part includes two RRSs, and the TRU in each RSS is the TRU that processes three carrier frequencies. The digital baseband unit of the indoor part of the base station includes the BBU that processes six carrier frequencies. The BBU is connected with two BIU-Ls and the two BIU-Ls are connected with the BIU-Rs of the two RRSs through the optical cable respectively, and each BIU-R is connected with the TRU of its RRS. Thus, the indoor part of the base station and the two RRSs form a star connection, i.e. one base station covers two different areas with two remote RRSs and the two RRSs cover different areas with the eight-antenna covering manner.

Embodiment 2

IF Remote Manner

Figure 6:
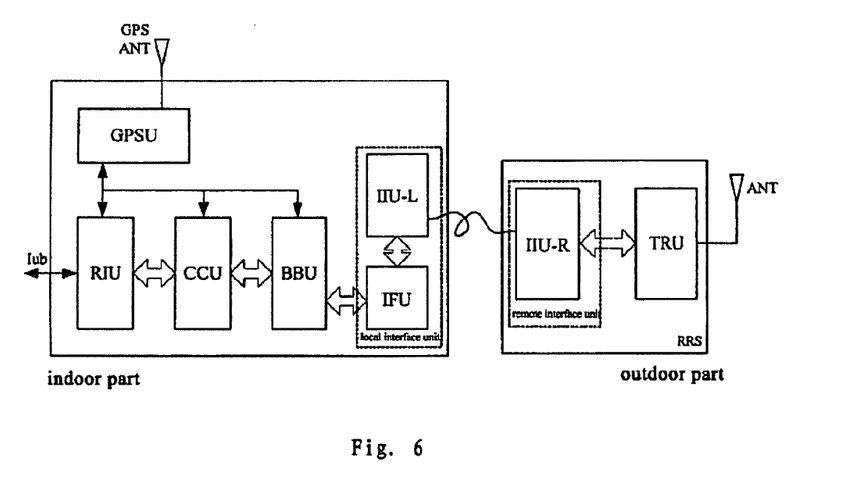
FIG. 6 is a schematic diagram showing a configuration of a base station system according to a second embodiment of the present invention.

FIG. 6 is a schematic diagram showing a configuration of a base station system according to a second embodiment of the present invention.

The local interface unit includes an IFU and an IIU-L. The IFU is a digital IF module of the conventional RFU. The configuration of the IIU-L includes two parts, i.e., a downlink path and an uplink path, as shown in FIG. 7(a) and FIG. 7(b) respectively.

Figure 7A:
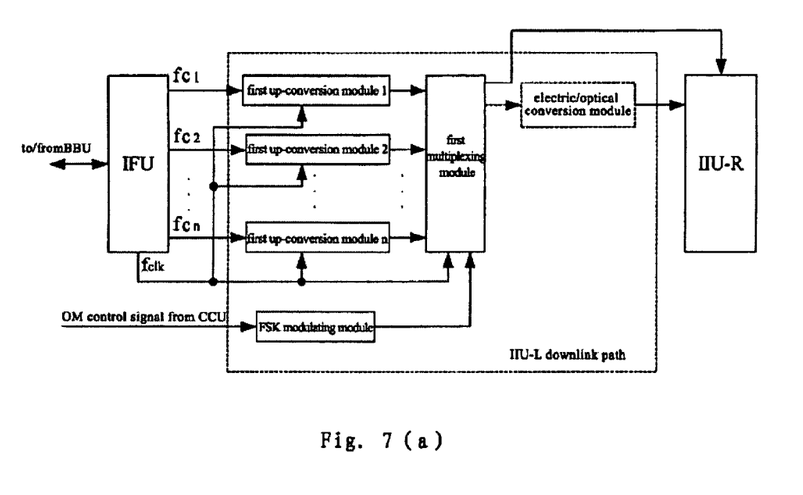
FIG. 7(a) is a schematic diagram showing modules constituting a downlink path of a local IF interface unit (IIU-L) shown in FIG. 6 and their functions.
Figure 7B:
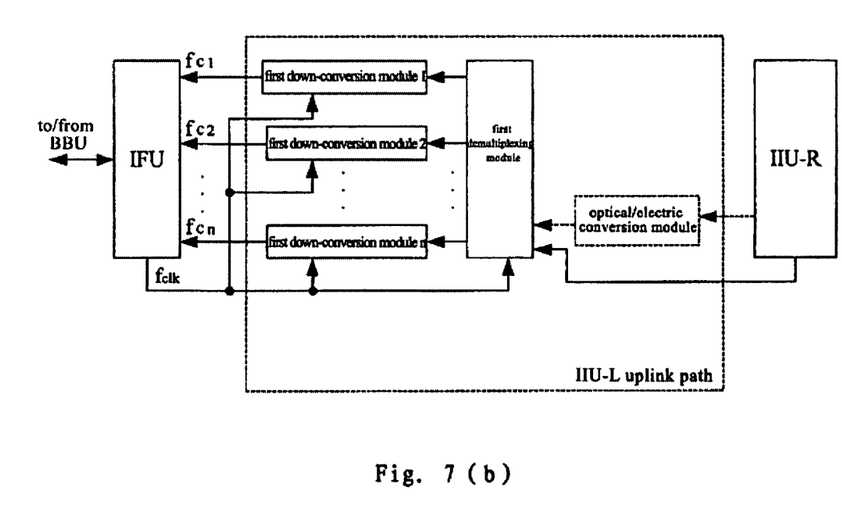
FIG. 7(b) is a schematic diagram showing modules constituting an uplink path of the IIU-L shown in FIG. 6 and their functions.

FIG. 7(a) is a schematic diagram showing modules constituting the downlink path of the local IF interface unit and their functions. As shown in FIG. 7(a), the IIU-L downlink path includes the following modules.

If the IIU-L is connected with an remote IF interface unit (IIU-R) of the RRS through an IF cable, the IIU-L includes first up-conversion modules, a frequency shift keying (FSK) modulating module and a first multiplexing module; if the IIU-L is connected with the IIU-R of the RRS through an optical cable, the IIU-L includes first up-conversion modules, a FSK modulating module, a first multiplexing module and an electric/optical conversion module. Functions of each module are described below.

The first up-conversion modules convert the central frequencies of the analog IF signals from the IFU of the local interface unit to different central frequencies based on the frequency of the clock signal fclk from the IFU of the local interface unit and transmit the converted analog IF signals to the first multiplexing modules. The clock signal fclk is shown in FIG. 6 and is transmitted downwardly to the BBU by the GPSU and then transmitted to the IFU by the BBU; or may be directly transmitted downwardly to the IFU by the GPSU.

The FSK modulating module is for modulating an operation and maintenance (OM) control signal from the CCU to a certain fixed frequency and outputting the modulated OM control signal to the multiplexing module. The OM control signal may be used to control the TRU to start the RF processing etc.

The first multiplexing module is for receiving the fclk signal from the IFU of the local interface unit, the up-converted analog IF signals and the OM control signal being FSK modulated, and for multiplexing the received signals in frequency, and then for transmitting a multiplexed analog IF signal to the IIU-R through the IF cable or converting the multiplexed analog signal to an optical signal by the electric/optical conversion module and then transmitting the optical signal to the IIU-R.

FIG. 7(b) is a schematic diagram showing modules constituting the uplink path of the local IF interface unit shown in FIG. 6 and their functions. As shown in FIG. 7(b), the IIU-L uplink path includes the following modules.

If the IIU-L is connected with the IIU-R through an IF cable, the IIU-L includes a first demultiplexing module and first down-conversion modules; if the IIU-L is connected with the IIU-R through an optical cable, the IIU-L includes an optical/electric conversion module, a first demultiplexing module and first down-conversion modules. Functions of each module are described below.

The first demultiplexing module is for receiving the analog IF signal from the second multiplexing module of the IIU-R, demultiplexing the analog IF signal in frequency and outputting the demultiplexed analog IF signals to the first down-conversion modules.

The first down-conversion modules convert the central frequencies of the analog IF signals at different central frequencies from the first demultiplexing module to central frequencies of the analog IF signals outputted from the IFU based on the frequency of the clock signal fclk from the IFU of the local interface unit and transmits the converted analog IF signals to the IFU of the local interface unit.

The IFUs in FIG. 7(a) and in FIG. 7(b) refer to the same IFU.

Conversion or mixing, FSK modulation and multiplexing/demultiplexing in frequency are well-known technologies so will not be described in detail here. What will be emphasized here is an implementation of the base station system of the present invention.

The remote interface unit is a remote IF interface unit (IIU-R). The IIU-R also includes two parts, i.e., the downlink path and the uplink path. The structures of the two parts are the same as that of the uplink path and the downlink path of the IIU-L shown in FIG. 7(b) and FIG. 7(a). The differences are that in the IIU-R, the FSK modulating module is replaced by a FSK demodulating module which is in the downlink path for demodulating the OM control signal being FSK modulated from the IIU-L and recovers the OM control signal. The FSK demodulation is well-known technology and will not be described in detail here. In addition, in the remote interface unit, the frequency base fclk signals from the up-conversion modules and the down-conversion modules are the fclk signals of the analog IF signals demultplexed by the demultiplexing module of the remote interface unit.

Specifically, the IIU-R downlink path includes the following modules.

If the IIU-L is connected with the IIU-R through an IF cable, the IIU-R includes a second demultiplexing module, second down-conversion modules and a FSK demodulating module; if the IIU-L is connected with the IIU-R through an optical cable, the IIU-R includes an optical/electric conversion module, a second demultiplexing module, second down-conversion modules and a FSK demodulating module. Functions of each module are described below.

The second demultiplexing module receives the analog IF signal from the first multiplexing module of the IIU-R, demultiplexes the signal and outputs the demultiplexed analog IF signals to the second down-conversion modules, the demultiplexed fclk signal to the TRU, the second up-conversion modules and the second down-conversion modules, the demultiplexed OM control signal being FSK modulated to the FSK demodulating module.

The second down-conversion modules convert the analog IF signals from the second demultiplexing module based on the frequency of the fclk signal from the second demultiplexing module, convert the central frequencies of the analog IF signals at different central frequencies from the second demultiplexing module to the original central frequencies and outputs the converted analog IF signals to the TRU.

The FSK demodulating module demodulates the modulated OM control signal from the second demultiplexing module to the original OM control signal and outputs the demodulated signal to the TRU.

The IIU-R uplink path includes the following modules.

If the IIU-L is connected with the IIU-R through an IF cable, the IIU-R includes second up-conversion modules and a second multiplexing module; if the IIU-L is connected with the IIU-R through an optical cable, the IIU-R includes second up-conversion modules, a second multiplexing module and an electric/optical conversion module. Functions of each module are described below.

The second up-conversion modules convert the central frequencies of the analog IF signals from the TRU to different central frequencies based on the frequency of the fclk signal from the second demultiplexing module and output the converted analog IF signals to the second multiplexing module.

The second multiplexing module receives the converted analog IF signals from the second up-conversion modules, multiplexes the received signals in frequency and outputs the multiplexed analog IF signals to the first demultiplexing module of the IIU-L.

The IIU-R and the IIU-L are connected in the following way.

If the indoor part of the base station is connected with the RSS through an IF cable, the multiplexing module of the IIU-L is connected with the demultiplexing module of the IIU-R through the IF cable and the demultiplexing module of the IIU-L is connected with the multiplexing module of the IIU-R through the IF cable and at this time, the interface signals transmitted between the IIU-L of the local interface unit of the indoor part of the base station and the IIU-R of the RRS are the analog IF electric signals.

If the indoor part of the base station is connected with the RSS through an optical cable, the electric/optical conversion module of the IIU-L is connected with optical/electric conversion module of the IIU-R through the optical cable and the optical/electric conversion module of the IIU-L is connected with electric/optical conversion module of the IIU-R through the optical cable and at this time, the interface signals transmitted between the IIU-L of the local interface unit of the indoor part of the base station and the IIU-R of the RRS are the analog IF optical signals.

The TRU is a RF transceiver module of a conventional RFU. The functions of the TRU have been described in the first embodiment and will not be described in detail here. Its functions are also to perform the conversion between an analog IF signal and an analog RF signal. The differences are that in the current embodiment, through the downlink path, the TRU receives the analog IF signals outputted from the down-conversion modules of the IIU-R, converts the analog IF signals to the analog RF signals and transmits to the ANT; through the uplink path, the TRU receives the analog RF signals from the ANT, converts the analog RF signals to the analog IF signals and transmits to the up-conversion modules of the IIU-R.

In addition, as shown in FIG. 7(a) and FIG. 7(b), there are n up/down-conversion modules, wherein the number n is decided by the number m of antennas in the antenna covering mode adopted by the base station in practice. If the base station adopts an eight-antenna covering mode, i.e. m=8, n=m, which means there are eight up/down-conversion modules.

The above is the base station system realized by the IF remote manner according to the present invention. The above solution shows the indoor part and the RRS are divided with the analog IF signal in this embodiment and the indoor part and the RRS can be connected with the optical cable or the IF cable. When the distance between the indoor part and the RRS is near, the IF remote manner may be used.

Similarly, in the IF remote manner, the RRS may use different covering modes according to the requirements, such as the single antenna covering, two-antenna covering, four-antenna covering, eight-antenna covering etc. When the IF remote manner is adopted, optical transceivers at different rates can be used, such as electric/optical or optical/electric conversion chips at different rates, to perform the signal conversion. The indoor part of the base station can be connected with one or more RRS through one or more interface unit to form a chain, star or mixed connection with the optical cable or the IF cable.

Figure 8:
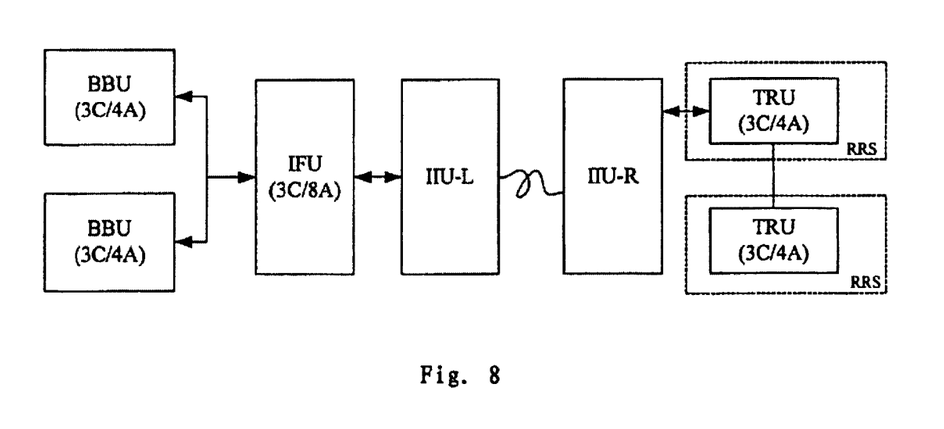
FIG. 8 is a schematic diagram showing a connection between an indoor part of the base station and a RRS according to the configuration of the second embodiment of the present invention.

FIG. 8 is a schematic diagram showing a connection between the indoor part of the base station and the RRS according to a second embodiment of the present invention. Suppose each remote TRU processes three carrier frequencies, a four-antenna covering manner is adopted and each BBU performs the baseband processing for the three carrier frequencies. According to the structure of the base station of the second embodiment of the invention, as shown in FIG. 8, in the IF remote manner, if the IFU processes three carrier frequencies with the eight-antenna covering, each RSS of the base station remote part includes one TRU which processes three carrier frequencies and the digital baseband unit of the indoor part of the base station includes two BBUs each processes three carrier frequencies. The two BBUs are connected with the IFU and the IFU is connected with the remote IIU-R through one IIU-L by an IF cable or an optical cable. The two RRSs are connected with each other through an IF cable or an optical cable. Thus, the indoor part of the base station and the two RRSs form a star connection, i.e. one base station covers two different areas with two remote RRSs and the two RRSs cover different areas with the four-antenna covering manner.

Embodiment 3

Digital Baseband Remote Manner Plus IF Remote Manner

Figure 9:
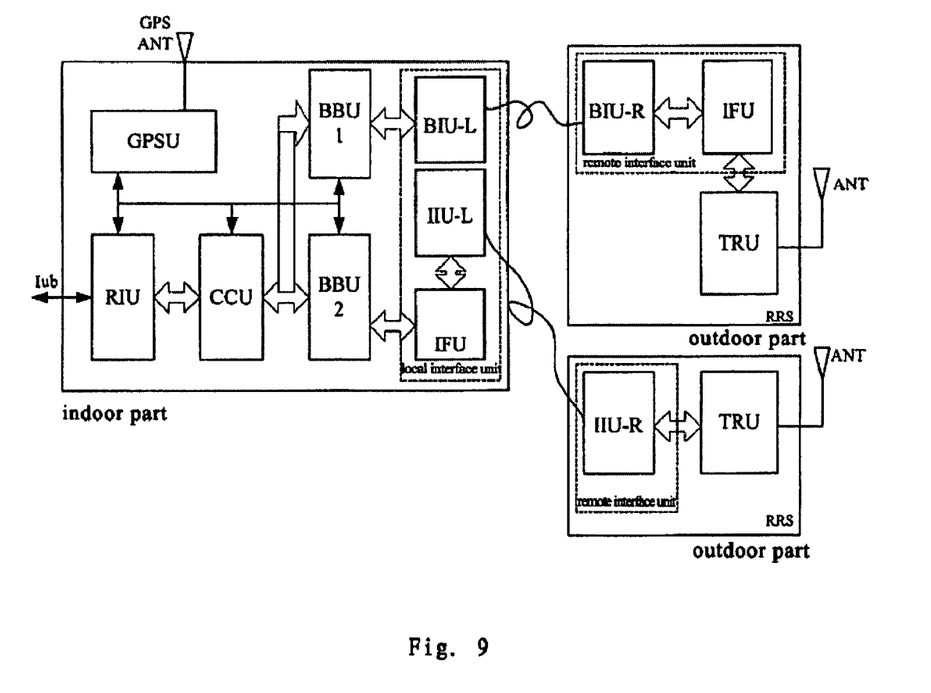
FIG. 9 is a schematic diagram showing a configuration of a base station system according to a third embodiment of the present invention.

FIG. 9 is a schematic diagram showing a configuration of a base station system according to the third embodiment of the present invention.

The local interface unit includes three units that are the BIU-L, IFU and IIU-L and the two remote interface units includes three units that are the BIU-R, IFU and IIU-R respectively.

The indoor part further includes the RIU, CCU, BBU1, BBU2 and GPSU. It should be noted here that in the current embodiment, the BIU-L and the IFU of the indoor part may correspond to one BBU respectively, as shown in FIG. 9, i.e. the configuration and function of BBU1 and BBU2 are the same, and may also share one BBU. The RRS further includes the TRU.

The structure of the current embodiment shows in practice, this kind of base station system may be more flexible. One base station structure can support two remote manners so that the user may flexibly choose the remote manner according to the distance between the indoor part of the base station and the RRS. For example, when the distance is short, the IF remote manner may be used because the IF cable is cheap. And the user may flexibly choose the remote manner according to the price of the fiber module. For example, if the analog fiber is cheap, the IF remote manner may be used and if the digital fiber is cheap, the digital baseband remote manner may be used. Specifically, if the base station of the invention supports both the covering in a building and the covering of a large remote area, a RRS adopting the IF remote manner may be used to realize the covering in the building and another RRS adopting the digital baseband remote manner may be used to realized the covering in a large remote area.

The above descriptions are only preferred embodiments of the present invention and will not limit the scope sought for protection in the claims.

The invention claimed is:

1. A base station system comprising an indoor part and an outdoor part, wherein the indoor part includes a RNC interface unit RIU for performing an interface function between Node B and the RNC, and a GPSU and a GPS antenna for providing a clock signal to other units in Node B, wherein, the indoor part further comprises:

a central control unit CCU, for performing a main control function of Node B and a function of switching signaling and service data between units of Node B;

a digital baseband unit BBU, for performing a processing function of the digital signal at the symbol level and the chip level at the physical layer and for intercommunicating digital baseband signals with a local interface unit; and the local interface unit, for converting the digital baseband signal from the BBU to an interface signal and transmitting the interface signal to a remote interface unit, or for converting an interface signal from the remote interface unit to a digital baseband signal and transmitting the digital baseband signal to the BBU;

the outdoor part is a remote RF subsystem RRS, including an antenna for receiving and transmitting an analog RF signal, and further comprises:
a remote interface unit, for converting the interface signal from the local interface unit to an analog IF signal and transmitting the analog IF signal to a RF transceiver unit TRU, or for converting an analog IF signal from the TRU to an interface signal and transmitting to the local interface unit; and
the RF transceiver unit TRU, for converting the analog IF signal from the remote interface unit to an analog RF signal and transmitting the analog RF signal to the antenna, or for converting an analog RF signal from the antenna to an analog IF signal and transmitting the analog IF signal to the remote interface unit.

2. The system according to claim 1, wherein
the local interface unit is a local baseband interface unit BIU-L, and
the remote interface unit includes a remote baseband interface unit BIU-R and a digital IF unit IFU, wherein
the BIU-R receives the interface signal from the BIU-L and outputs a digital baseband signal to the IFU, and then the IFU converts the received digital baseband signal to an analog IF signal and outputs the analog IF signal to the TRU;
or the IFU receives the analog IF signal from the TRU and outputs a digital baseband signal to the BIU-R, and then the BIU-R converts the received digital baseband signal to an interface signal and transmits the interface signal to the BIU-L.

3. The system according to claim 2, wherein the interface signal is a digital baseband optical signal.

4. The system according to claim 2, wherein
the local interface unit includes an IFU and an IIU-L, and the remote interface unit includes an IIU-R, wherein
the IFU receives the digital baseband signal from the BBU, outputs an analog IF signal to the IIU-L and the IIU-L converts the received analog IF signal to an interface signal and transmits the interface signal to the IIU-R;
or the IIU-L receives the interface signal from the IIU-R and outputs an analog IF signal to the IFU, and then the IFU converts the received analog IF signal to a digital baseband signal and outputs the digital baseband signal to the BBU.

5. The system according to claim 4, wherein
the interface signals transmitted between the BIU-L and the BIU-R are digital baseband optical signals, and
the interface signals transmitted between the IIU-L and the IIU-R are analog IF signals or analog IF optical signals.

6. The system according to claim 4, wherein the BBU comprises a first digital baseband unit BBU1 and a second digital baseband unit BBU2 for processing digital signals at the symbol level and the code chip level at the physical layer, wherein the BBU1 interchanges the digital baseband signals with the BIU-L of the local interface unit and the BBU2 interchanges the digital baseband signals with the IFU of the local interface unit.

7. The system according to claim 2, wherein the BIU-L is an optical transceiver module; the BIU-R is an optical transceiver module.

8. The system according to claim 1, wherein
the remote interface unit is a remote IF processing unit IIU-R;
the local interface unit includes an IFU and a local IF interface unit IIU-L; wherein
the IFU receives the digital baseband signal from the BBU, outputs an analog IF signal to the IIU-L and the IIU-L converts the received analog IF signal to an interface signal and transmits the interface signal to the IIU-R;
or the IIU-L receives the interface signal from the IIU-R and outputs an analog IF signal to the IFU, and then the IFU converts the received analog IF signal to a digital baseband signal and outputs the digital baseband signal to the BBU.

9. The system according to claim 8, wherein the interface signal is an analog IF signal or an analog IF optical signal.

10. The system according to claim 8, wherein
the IIU-L comprises:
first up-conversion modules, for converting analog IF signals from the IFU and outputting the converted analog IF signals at different central frequencies to a first multiplexing module;
a FSK modulating module, for modulating an operating and maintaining control signal from the CCU to a certain fixed frequency and outputting the modulated operating and maintaining control signal to the first multiplexing module;
the first multiplexing module, for multiplexing in frequency the received signals and a clock signal fclk from the IFU and outputting the multiplexed analog IF signal to a second demultiplexing module;
a first demultiplexing module, for demultiplexing an analog IF signal from a second multiplexing module of the IIU-R and outputting demultiplexed analog IF signals at different central frequencies to first down-conversion modules;
the first down-conversion modules, for converting the analog IF signals at different central frequencies from the first demultiplexing module and outputting the converted analog IF signals to the IFU of the local interface unit;
the IIU-R comprises:
the second demultiplexing module, for demultiplexing the analog IF signal from the first multiplexing module of the IIU-R and outputting the demultiplexed analog IF signals to second down-conversion modules, the demultiplexed fclk signal to the TRU, second up-conversion modules and a second down-conversion module, the demultiplexed OM control signal being FSK modulated to a FSK demodulating module;
the second down-conversion modules, for converting the analog IF signals at different central frequencies from the second demultiplexing module and outputting the converted analog IF signals to the TRU;
the second up-conversion modules, for converting the analog IF signals from the TRU and outputting the converted analog IF signals at different central frequencies to the second multiplexing module;
the second multiplexing module, for multiplexing in frequency the analog IF signals from the second up-conversion modules and outputting the multiplexed analog IF signal to the first demultiplexing module of the IIU-L;
the FSK demodulating module, for demodulating the modulated OM control signal from the second demultiplexing module and outputting the demodulated signal to the TRU.

11. The system according to claim 10, wherein
the number of the first up-conversion modules and the first down-conversion modules respectively is one or more than one and the number of the first up-conversion modules and the first down-conversion modules respectively equals to the number of the antennas used;
the number of the second up-conversion modules and the second down-conversion modules respectively is one or more than one and the number of the second up-conversion modules and the second down-conversion modules respectively equals to the number of the antennas used.

12. The system according to claim 10, wherein the IIU-L and IIU-R further comprise an optical transceiver module respectively, for receiving the analog IF signals from the first multiplexing module of the IIU-L and the second multiplexing module of the IIU-R respectively and outputting the analog IF optical signals to the optical cable;

or for receiving the analog IF optical signals from the optical cable respectively and outputting the analog IF signals to the first multiplexing module of the IIU-L and the second multiplexing module of the IIU-R respectively.

13. The system according to claim 1, wherein the antenna is a single antenna or a double antenna or a four-antenna or an eight-antenna.

14. The system according to claim 1, wherein the interface signal is a digital baseband optical signal and/or an analog IF signal; or a digital baseband optical signal and/or an analog IF optical signal.

15. The system according to claim 1, wherein the local interface unit connects with the remote interface unit through an optical cable or an IF cable.

16. The system according to claim 1, wherein the indoor part connects with one or more than one RRS through one or more than one interface unit to form a serial, star or mixed connection.

* * * * *